(12) United States Patent
Yamada

(10) Patent No.: US 6,705,579 B2
(45) Date of Patent: Mar. 16, 2004

(54) FOLDING CUP HOLDER

(75) Inventor: Satoshi Yamada, Kanagawa-ken (JP)

(73) Assignee: Piolax Inc., Kanagawa-ken (JP)

( * ) Notice: Subject to any disclaimer, the term of this patent is extended or adjusted under 35 U.S.C. 154(b) by 0 days.

(21) Appl. No.: 10/201,994

(22) Filed: Jul. 25, 2002

(65) Prior Publication Data
US 2003/0019993 A1 Jan. 30, 2003

(30) Foreign Application Priority Data

Jul. 30, 2001 (JP) .................................. P2001-229821

(51) Int. Cl.⁷ ................................................ B60N 3/10
(52) U.S. Cl. .................... 248/311.2; 224/926; 224/549; 224/553
(58) Field of Search ............................. 248/311.2, 136, 248/222.51; 224/926, 549, 553; 297/188.15, 188.16, 188.19, 188.01, 188.14; 211/104

(56) References Cited
U.S. PATENT DOCUMENTS 5,868,448 A * 2/1999 Izumo ....................... 296/37.1
6,047,937 A * 4/2000 Huang ..................... 248/311.2
6,085,953 A * 7/2000 Bober et al. ................. 224/282
6,227,509 B1 * 5/2001 Plocher et al. ........... 248/311.2
6,513,687 B1 * 2/2003 Siniarski ..................... 224/282

FOREIGN PATENT DOCUMENTS

JP 10-278652 10/1998
JP 2000-8687 1/2000

OTHER PUBLICATIONS

English Language Abstract of JP 10–278652.
English Language Abstract of JP 2000–8987.

* cited by examiner

Primary Examiner—Ramon O. Ramirez
Assistant Examiner—Jon Szumny
(74) Attorney, Agent, or Firm—Greenblum & Bernstein, P.L.C.

(57) ABSTRACT

A folding cup holder with a base plate including one or more through holes; a holder arm for holding a cup, the holder arm being pivotally supported to the base plate; and a tray including one or more latch arms respectively inserted to the through holes, and axially supported to the base plate. The latch arms and the through holes are engaged with each other to hold the tray in a position for holding a cup and engagement thereof is cancelled in case that excessive force is applied to the tray.

4 Claims, 8 Drawing Sheets

FOLDING CUP HOLDER

BACKGROUND OF THE INVENTION

1. Field of the Invention

The present invention relates to a folding cup holder attached to an interior of a passenger compartment in an automobile, and more particularly to a folding cup holder having a structure which does not easily break even when accidental external force is applied, and is easy to be restored.

2. Description of the Related Art

Various kinds of equipment such as a cup holder are mounted to the interior of the passenger compartment in an automobile for the convenience of the passenger. There are cup holders which are built into the interior, however, there is proposed cup holders of an add-on type. The add-on type cup holder is proposed as a folding structure, which does not obstruct the passenger when it is not in use.

In the folding cup holder, it is necessary to make an arm for holding a cup and a structure for supporting the arm narrow and small, for the purpose of achieving both of the matters of the cup holder being compactly foldable and the cup holder being expandable largely. Accordingly, it is necessary to employ a countermeasure to prevent the cup holder from being broken in the case where accidental external force is applied. Japanese Patent Application Laid-open No. 2000-8687 shows an art of the folding cup holder. This cup holder is fixed to a wall surface or the like of the interior, can be folded compactly when not being used, and can be expanded forward when being used. The structure is such that a structure for supporting a bottom plate is cancelled so as to prevent the structure from being broken when accidental external force is applied.

SUMMARY OF THE INVENTION

According to the proposed folding cup holder mentioned above, when the structure for supporting the bottom plate is cancelled due to the accidental external force, the bottom plate drops down. In order to restore this, it is necessary to reassemble the bottom plate in the supporting structure again according to a troublesome operation. It is hard to smoothly execute this operation without considerable practice, and in particular, it is even harder to execute while driving the vehicle.

The present invention is made in view of the above problem, and an object of the present invention is to provide a folding cup holder having a structure which does not easily break even when accidental external force is applied and can be easily restored.

According to the present invention, a folding cup holder is provided with a base plate including one or more through holes; a holder arm for holding a cup, the holder arm being pivotally supported to the base plate; and a tray including one or more latch arms respectively inserted to the through holes, and axially supported to the base plate. The latch arms and the through holes engage with each other to hold the tray in a position for holding a cup and an engagement thereof is easily cancelled in a case that excessive force is applied to the tray.

According to the structure mentioned above, when excessive force is applied to the base plate, the latch arms easily displace from the through holes and the base plate becomes free to swing, so that it is possible to prevent the base plate and a bearing thereof from being broken. Further, at a time of making the structure in an initial state, the latch arms easily engage with the through holes simply moving the base plate upward by hand and inserting the latch arms to the through holes. Accordingly, it is possible to easily restore to the initial state without a complex operation.

Preferably, each of the through holes is provided with a leaf spring for catching the latch arm and the leaf spring is fitted to an edge thereof. The engagement and the cancellation of the latch arms mentioned above can be more smoothly executed by engaging the latch arms with the leaf springs in place of the through holes. Accordingly, as well as a risk of breakage being reduced, the restoring operation can be more easily executed.

More preferably, a distal end of each of the latch arms is formed in a fork shape. Since the fork shape increases flexibility of the distal end of the latch arm, the risk of breakage is reduced, and the restoring operation can be more easily executed.

Further preferably, through holes and the latch arms are constituted in a pair respectively and proximal ends of the latch arms are integrally connected by a rib which has a U-shaped end portion. The latch arms are reinforced with the rib so that the latch arms are hard to be broken.

DETAILED DESCRIPTION OF THE PREFERRED EMBODIMENT

A cup holder according to the present invention is mainly intended to be applied to a side surface of a rear seat in a sport utility vehicle (SUV), however, it is not limited to this.

A description will be given below of a first embodiment of the present invention with reference to FIG. 1 to FIG. 6.

Figure 1:
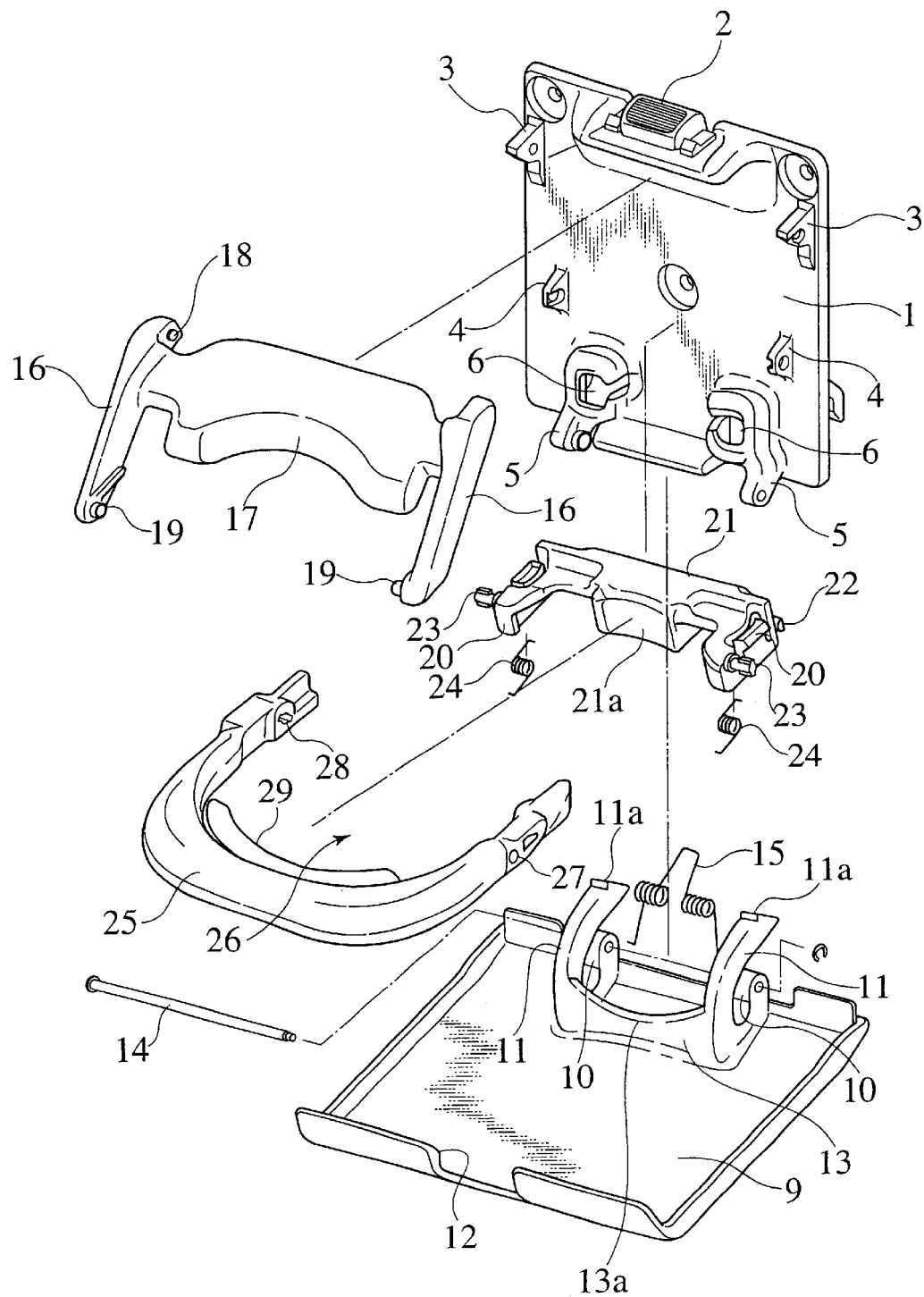
FIG. 1 is an exploded perspective view of a cup holder according to a first embodiment of the present invention.

A folding cup holder according to the present invention is provided with a base plate 1 for fixing to an inner wall surface of a passenger compartment, a pair of first arms 16 being pivotally supported by the base plate at the proximal end portions thereof, a pair of second arms 20 respectively having first latch portions and being pivotally supported by the base plate 1 at the proximal end portions thereof, and a holder arm 25 which is provided with a pair of second latch portions at both ends and which are pivotally supported by distal ends of the first arms 16 and distal ends of the second arms 20 by differential axes, as shown in FIG. 1. Further, the base plate 1 is provided with a tray 9 axially supported by a shaft 14 at a lower end thereof.

Figure 2:
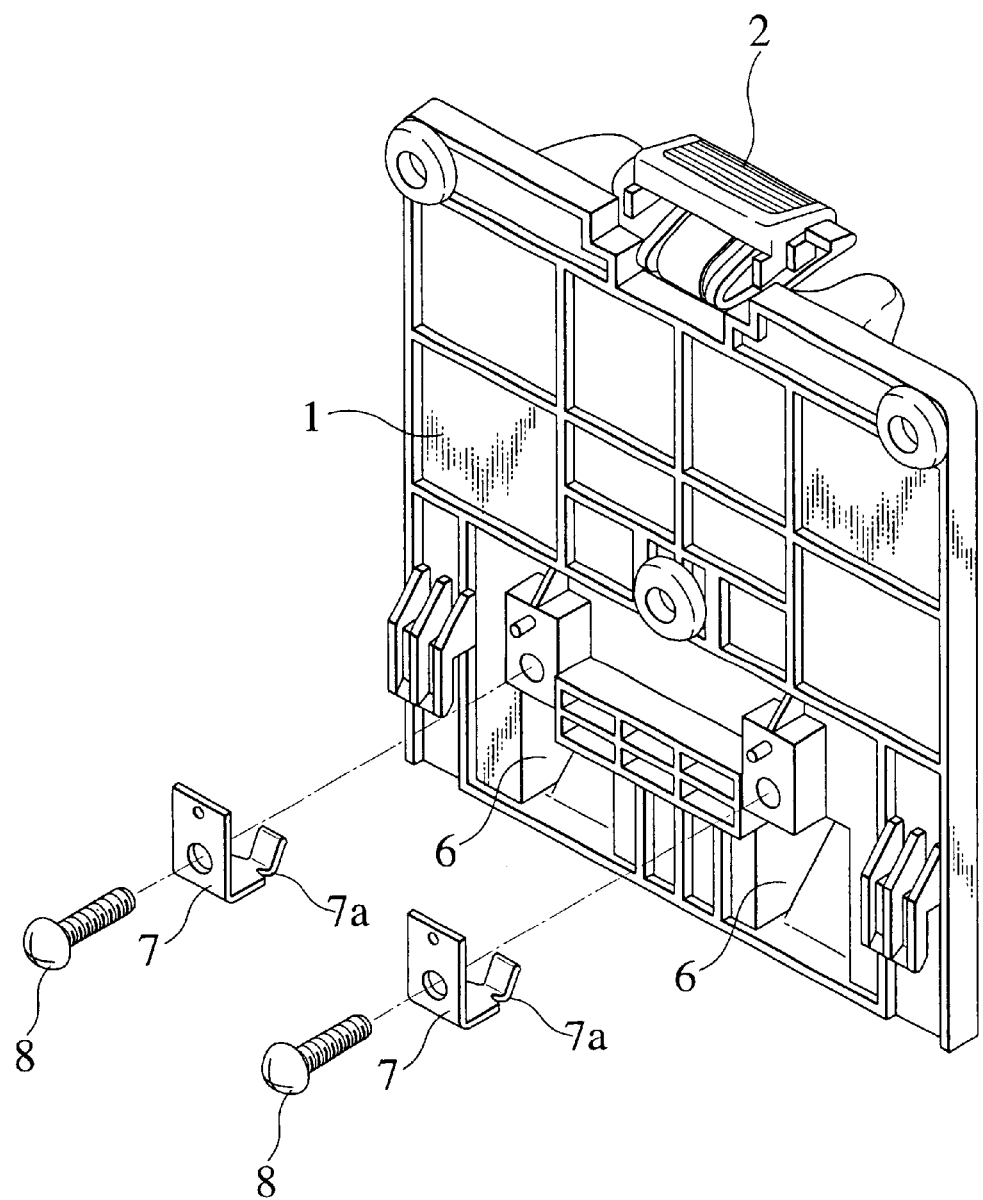
FIG. 2 is an exploded perspective view of a base plate according to the first embodiment of the present invention, showing a back surface thereof.

The base plate 1 is formed with its outline in a substantially square shape, and is provided with a lock piece 2 at an upper end thereof, a pair of protruding first bearings 3 at both ends on a slightly lower side thereof, a pair of protruding second bearings 4 at portions slightly close to a center on a still lower side thereof, and a pair of protruding third bearings 5 at lower ends. A pair of through holes 6 are formed near a lower end of the base plate 1 in a symmetrical manner, and are structured such as to receive latch arms 11 provided in a tray 9 mentioned below. A leaf spring 7 provided with a bent portion 7a for engaging with the latch arm 11 is fixed to a portion near an upper end of a back surface of each of the through holes 6 by a screw 8, as shown in FIG. 2.

The tray 9 is formed in a substantially square outer shape which is slightly larger than the base plate 1, and is provided with an engagement portion 12 in correspondence to the lock piece 2. The tray 9 is provided with a pair of bearings 10 protruding so as to correspond to the third bearings 5, and is axially supported to the base plate 1 by passing and inserting the shaft 14 through the bearings 5 and 10. A torsion coil spring 15 is fitted to the shaft 14 so as to energize the tray 9 in a releasing direction. The tray 9 is further provided with a pair of symmetrical latch arms 11, and a rib 13 integrally connects between the latch arms 11 and between the latch arms and the tray 9. A distal end of each of the latch arms 11 is provided with a hook 11a so as to be capable of engaging with the bent portion 7a mentioned above, and a distal end thereof is formed in a slanting surface. An end portion 13a of the rib 13 is formed in a U-shape so as not to get in the way of the cup.

A pair of first arms 16 is structured such that a yoke portion 17 commonly serving as a cup receiver integrally connects therebetween. A pivot portion 18 and a pivot portion 19 are integrally provided in a protruding manner to a proximal end side and a distal end side of each of the arms 16. The pivot portions 18 are respectively and rotatably fitted to the first bearings 3 provided in the base plate 1 on the outer sides thereof, whereby the first arms 16 are pivotally supported by the base plate 1. The pivot portions 19 are rotatably fitted to bearings 27 mentioned below of the holder arm 25 from outer sides thereof.

A pair of second arms 20 are structured such that a yoke portion 21 integrally provided with a cup rest 21a integrally connects therebetween. A pivot portion 22 and a pivot portion 23 are integrally provided in a protruding manner to a proximal end side and a distal end side of each of the arms 20. The pivot portions 22 are respectively and rotatably fitted to the second bearings 4 provided in the base plate 1 from inner sides thereof, whereby the second arms 20 are pivotally supported to the base plate 1. The respective pivot portions 23 are structured such that a pair of keys are provided in a protruding manner and can be aligned with a pair of key holes provided in bearings 28 mentioned below of the holder arm 25. The pivot portions 23 are rotatably fitted to the bearings 28 respectively from inner sides thereof, whereby the holder arm 25 is pivotally supported to the second arms 20. Further, torsion springs 24 are fitted between the pivot portions 23 and the bearings 28 so as to bias the holder arm 25 in an expanding direction.

The holder arm 25 is formed in a U-shape, and an inner side thereof forms an opening 26 for holding the cup. A pair of bearings 27 are opened on the outer sides of both ends thereof and a pair of bearings 28 are opened on the inner sides thereof, respectively. The bearings 27 and 28 are provided so that positions thereof are shifted forward and backward. The holder arm 25 is further provided with a movable auxiliary piece 29, which is biased in an inner direction of the holder arm 25 by a coil spring (not shown).

Next, a description will be given of a mode of use of the cup holder according to the present embodiment.

Figure 3:
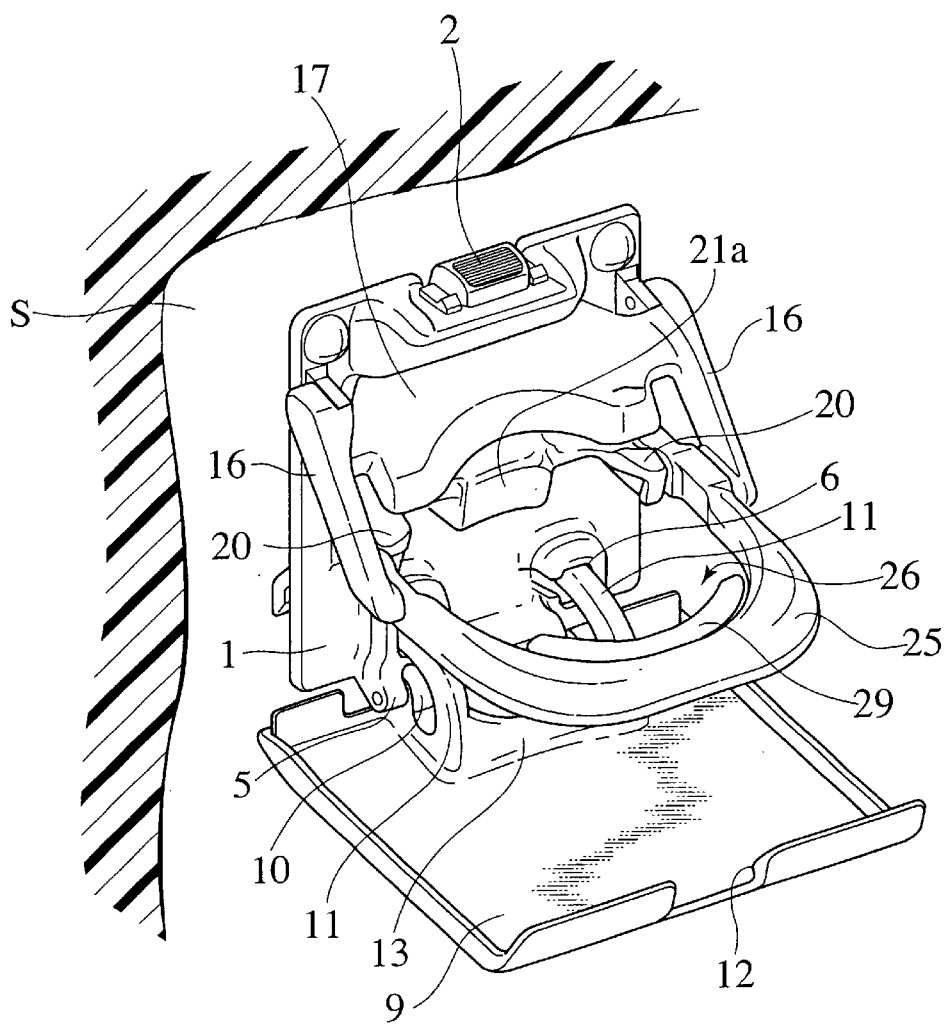
FIG. 3 is a perspective view of a cup holder according to the first embodiment of the present invention, showing a state in which the cup holder is in use.
Figure 4:
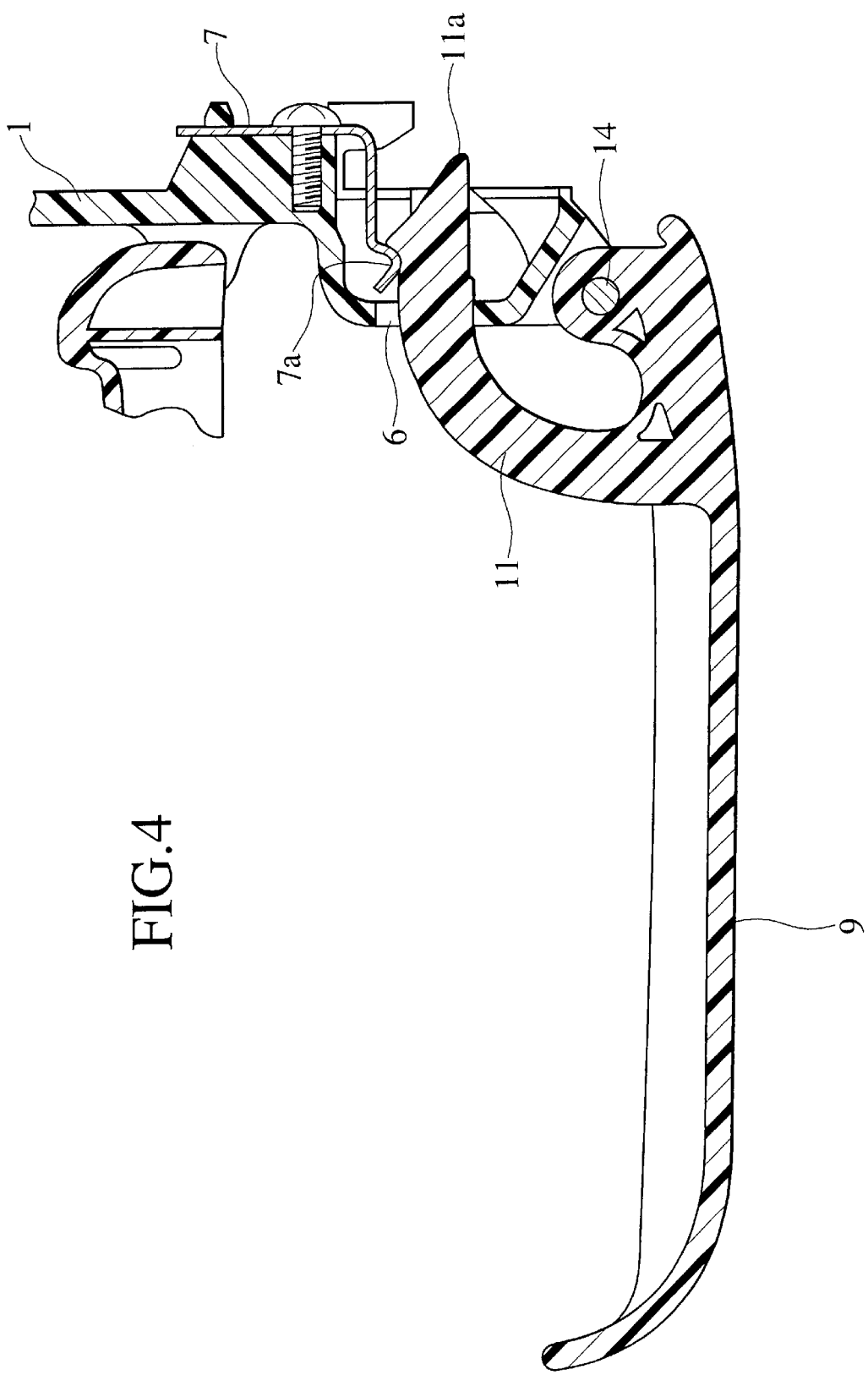
FIG. 4 is a cross sectional view of a tray and the base plate according to the first embodiment of the present invention, showing a state in which the tray is expanded and a latch arm is engaged.

FIG. 3 shows a state in which the cup holder according to the present embodiment is expanded. The holder arm 25 is pivotally supported to the first and second arms 16 and 20, and is biased in an expanding direction by the repulsive force of the torsion springs 24 fitted to the pivot portions 23 in the second arms 20. The tray 9 is biased in an expanding direction by a repulsive force of the torsion coil spring 15, and is maintained in a substantially horizontal state by the hooks 11a of the latch arm 11 being engaged with the bent portions 7a of the leaf springs 7.

In the state mentioned above, it is possible to insert the cup via the opening 26 of the holder arm 25. In correspondence to a size of the inserted cup, the auxiliary piece 29 swings downward so as to allow the insertion of a cup. When the cup is inserted, the holder arm 25, the cup receiver 17 and the cup rest 21a have, in harmony, an operation of supporting the cup. The tray 9 supports the cup from a lower side, which is inserted to the opening 26.

Figure 5:
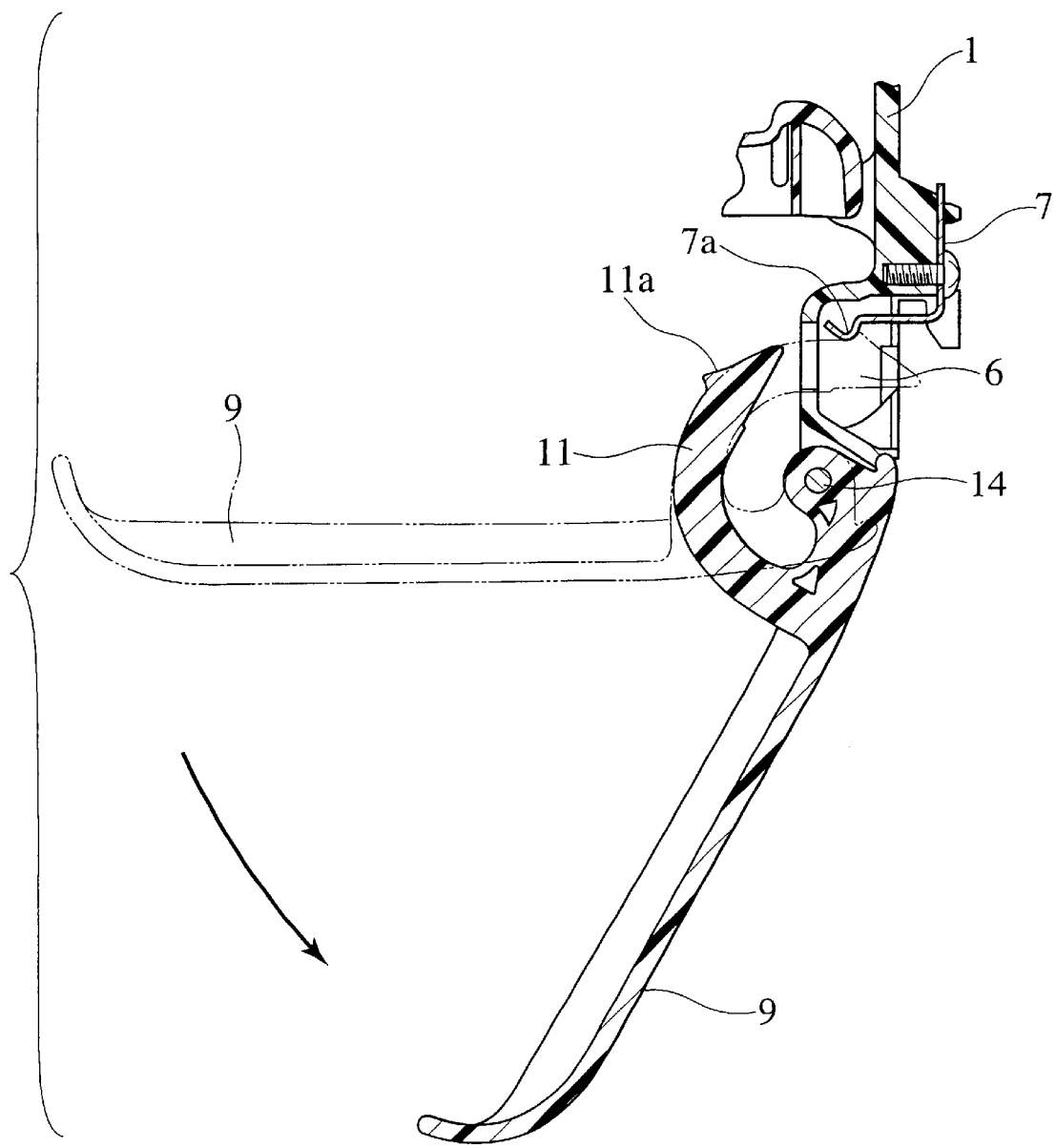
FIG. 5 is a cross sectional view of the tray and the base plate according to the first embodiment of the present invention, showing a state in which an external force is applied to the tray and an engagement of the latch arm is cancelled.

Since the leaf spring 7 is resilient, the leaf springs 7 deflect upward due to a great force application so as to allow the hooks 11a to pass therethrough. Then, as shown in FIG. 5, the latch arms 11 come off from the through holes 6, and the tray 9 can swing down to a lower side. Accordingly, even when excessive force is applied to the tray 9, it is possible to prevent the tray 9, the bearings 10 and the like from being broken. In order to return this to the initial state, the tray 9 is swung upward and the latch arms 11 are inserted to the through holes 6. When pressing the latch arms 11 further, the leaf springs 7 are pushed up by the slant surfaces provided in the hooks 11a, and the hooks 11a again engage with the bent portions 7a. Accordingly, it is possible to easily restore the tray 9 to a horizontal state.

Figure 6:
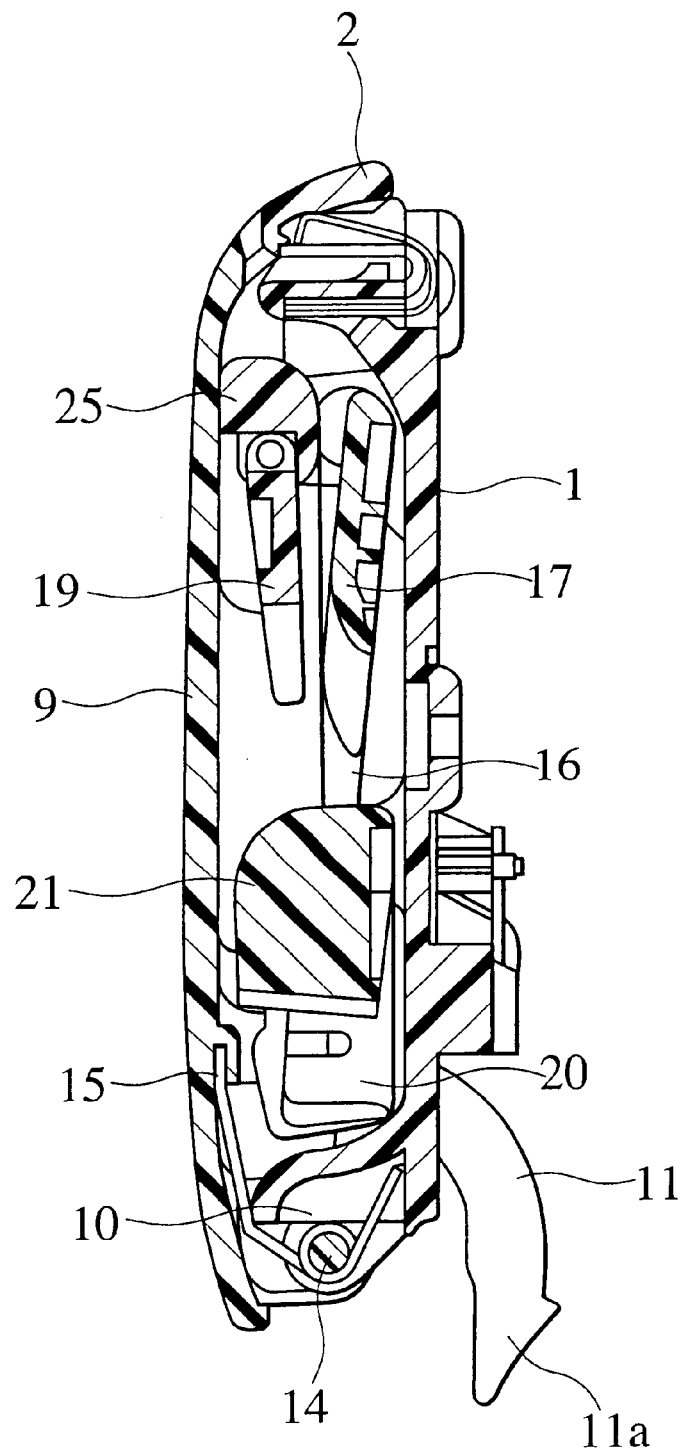
FIG. 6 is a cross sectional view of the cup holder according to the first embodiment of the present invention, showing a folded state.

When the cup holder is not in use, the tray 9 may be swung upward around the bearings 10. The holder arms 25 abut the tray 9 so as to be swung upward together. At this time, since the first arms 16 and the second arms 20 pivotally support the holder arms 25 by the differential axes, respectively, it is possible to swing downward. Accordingly, the respective arms are folded up within the tray 9, and when closing the tray 9, the engagement portion 12 is engaged with the lock piece 2, whereby the closed state shown in FIG. 6 is achieved.

Next, a description will be given of a second embodiment according to the present invention with reference to FIGS. 7 to 8B. A description of substantially similar portions to those of the first embodiment is omitted, and a description will be given of only different portions.

Figure 7:
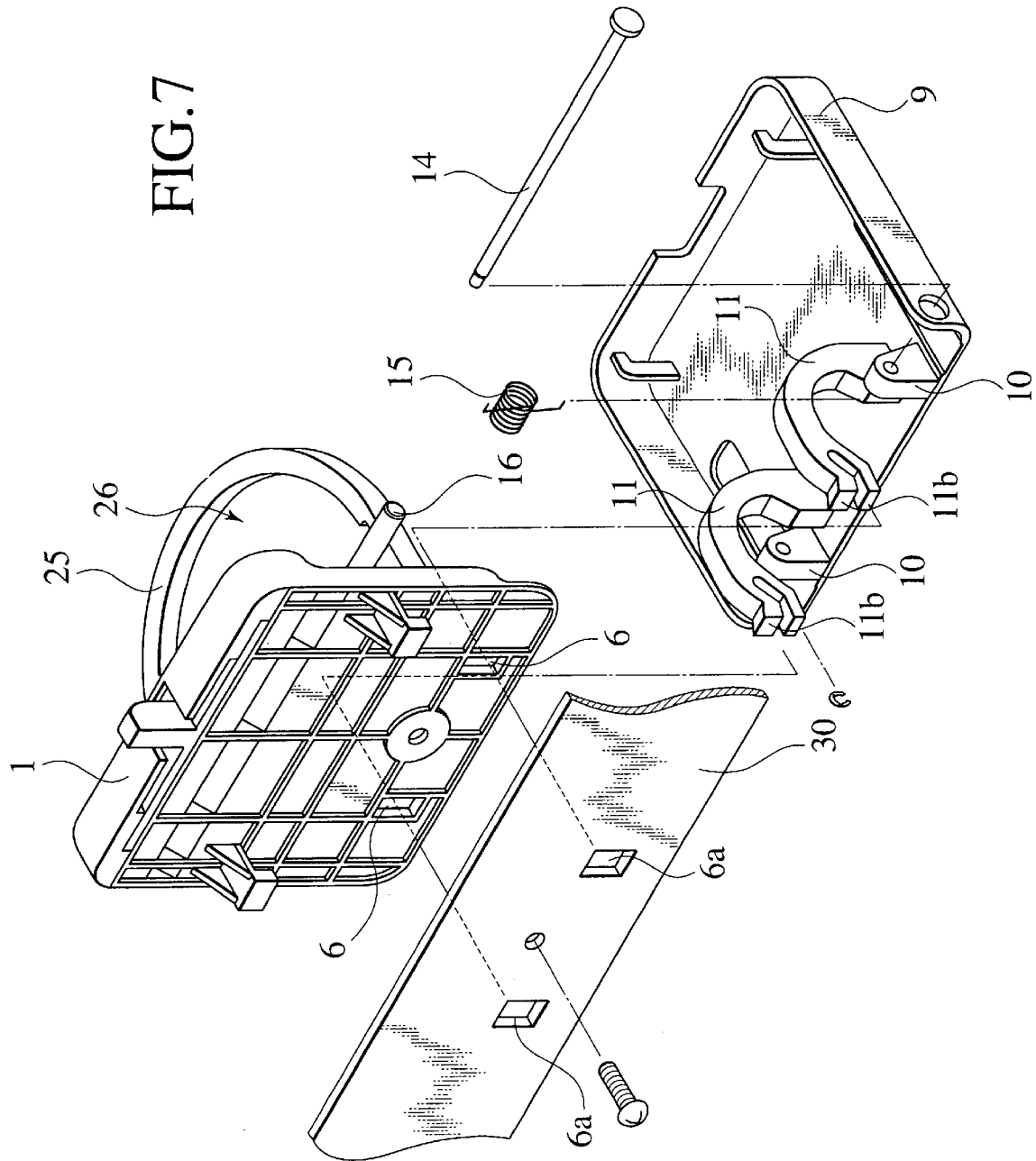
FIG. 7 is an exploded perspective view of a cup holder according to a second embodiment of the present invention.

In the present embodiment, each of the latch arms 11 is formed in a resilient fork 11b, as shown in FIG. 7. As is the case with the first embodiment, a hook having a slant distal end is provided in one of each of the fork ends 11b. A metal plate 30 is fixed to a back surface of the base plate 1 in place of the leaf spring. The metal plate 30 is provided with a pair of engagement holes 6a, corresponding to a pair of through holes 6 in the base plate 1. The diameter of the engagement holes 6a is smaller than that of through holes 6. Thereby the fork ends 11b in the latch arm 11 can be engaged with the engagement hole 6a.

Figure 8A:
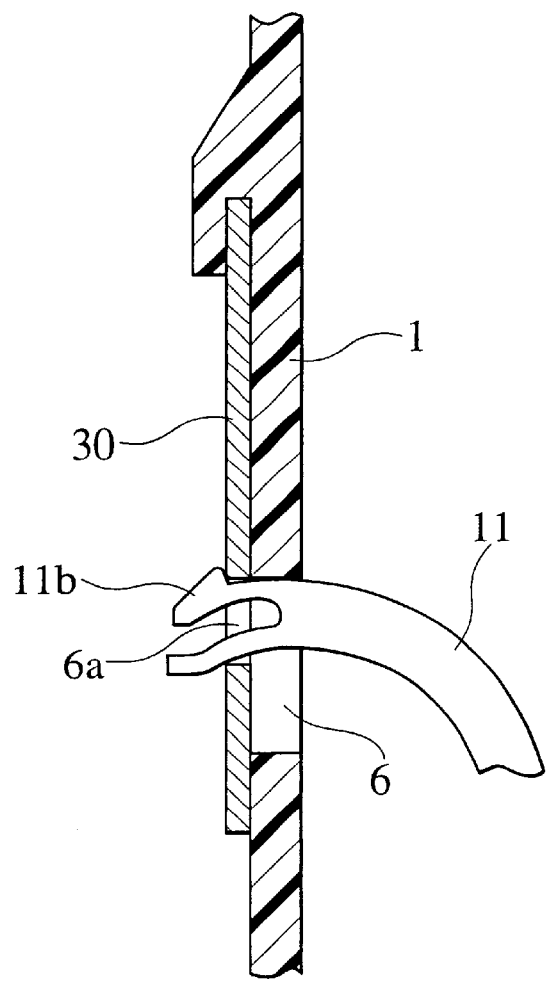
FIG. 8A is a cross sectional view of a tray and a base plate according to the second embodiment of the present invention, showing a state in which the tray is expanded and a latch arm is engaged.
Figure 8B:
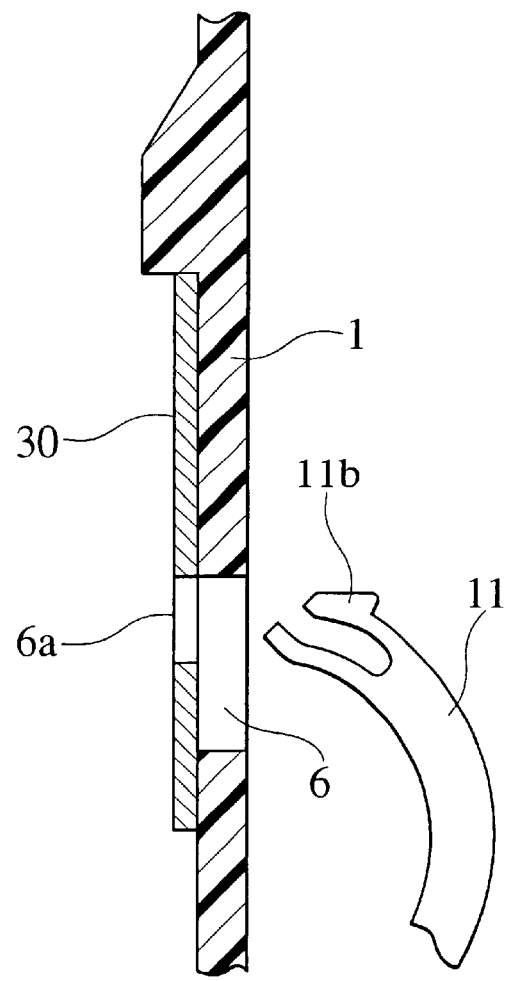
FIG. 8B is a cross sectional view of the tray and the base plate according to the second embodiment of the present invention, showing a state in which an external force is applied to the tray and an engagement of the latch arm is cancelled.

When using the cup holder according to the second embodiment, the respective fork ends 11b of the latch arms 11 engage with the engagement holes 6a, as shown in FIG. 8A. As well as one of the fork ends 11b engaging with an edge of the engagement hole 6a, the fork ends 11b elastically deform in a narrowing direction, thereby being engaged with the peripheral edge of the engagement hole 6a due to elastic force thereof.

Since the fork ends 11b are resilient, the fork ends 11b narrow with each other due to excessive force applied to the tray 9, whereby the fork ends 11b can easily pass through the engagement hole 6a. Then, as shown in FIG. 8B, the latch arms 11 displace from the through holes 6, and the tray 9 can swing down to a lower side. Accordingly, even when excessive force is applied to the tray 9, it is possible to prevent the tray 9, the bearings 10 and the like from being broken. In order to restore this to the initial state, the tray 9 is swung upward and the latch arms 11 are inserted to the through holes 6. When pressing the latch arms 11 further, the fork ends 11b are elastically deformed by the slant surfaces of the fork ends 11b, pass through the engagement holes 6a, and engage with the engagement holes 6a. Accordingly, it is possible to easily restore the tray 9 to the horizontal state.

The contents of Japanese Patent Application No. 2001-229821 (filed on Jul. 30, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings. For example, it is a possible modification that the relation between the pivot and the bearing is reversed.

What is claimed is:

1. A folding cup holder comprising:

a base plate including at least one through hole;

a holder arm pivotally supported by the base plate to hold a cup;

a tray including at least one latch arm inserted into the through holes respectively and axially supported by the base plate, wherein the latch arms and the through holes are engaged with each other to hold the tray in a position for holding a cup;

an engagement between the latch arms and the through holes is canceled when excessive force is applied to the tray;

the tray being pivotally connected to the base plate between an open position and a closed position, and a coil spring biasing the tray in the open position;

wherein a distal end of each of the latch arms is formed in a fork shape including a hook on only one side thereof; and a metal plate provided adjacent the base plate, the metal plate including a pair of engagement holes substantially corresponding to the through holes in the base plate;

wherein each hook engages one of the engagement holes so that only one side of each of the fork shaped latch arms engages the engagement hole.

2. The folding cup holder according to claim 1, wherein the through holes and the latch arms each comprise a pair, respectively, and proximal ends of the latch arms are integrally connected by a rib having a U-shaped end portion.

3. The folding cup holder according to claim 1, wherein the tray abuts the holder arm so as to be folded therewith.

4. A folding cup holder comprising:

a base plate including at least one through hole;

a holder arm pivotally supported by the base plate to hold a cup;

a tray including at least one latch arm inserted into the through holes, respectively, and axially supported by the base plate, wherein the latch arms and the through holes are engaged with each other to hold the tray in a position for holding a cup; and a leaf spring provided in each of the through holes and fixed to an edge thereof, the leaf spring including a bent portion that engages the latch arm so that the engagement between the latch arms and the through holes is canceled when excessive force is applied to the tray;

wherein each latch arm further includes a hook portion at a distal end thereof, each hook portion engaging the bent portion of a respective leaf spring and holding the tray in the open position.

* * * * *

UNITED STATES PATENT AND TRADEMARK OFFICE
CERTIFICATE OF CORRECTION

PATENT NO.    : 6,705,579 B2
DATED         : March 16, 2004
INVENTOR(S)   : S. Yamada et al.

It is certified that error appears in the above-identified patent and that said Letters Patent is hereby corrected as shown below:

Title page,
Item [57], ABSTRACT,
Line 2, after "holder" insert -- is provided --.

Signed and Sealed this

Second Day of November, 2004

JON W. DUDAS
*Director of the United States Patent and Trademark Office*